(12) United States Patent
Suehiro et al.

(10) Patent No.: US 8,054,367 B2
(45) Date of Patent: Nov. 8, 2011

(54) IMAGE DISPLAY DEVICE, IMAGE PICKUP DEVICE, IMAGE DISPLAY CONTROLLING METHOD, AND PROGRAM STORING MEDIUM THEREFOR WITH STOPPING OPERATION FOR STOPPING HIGH-SPEED FRAME ADVANCING

(75) Inventors: Masako Suehiro, Tokyo (JP); Makoto Oishi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 500 days.

(21) Appl. No.: 12/230,682

(22) Filed: Sep. 3, 2008

(65) Prior Publication Data
US 2009/0086080 A1    Apr. 2, 2009

(30) Foreign Application Priority Data

Sep. 27, 2007    (JP) .................... 2007-252269

(51) Int. Cl.
H04N 5/222    (2006.01)
(52) U.S. Cl. .............. 348/333.01; 348/333.05
(58) Field of Classification Search . 348/333.01–333.13
See application file for complete search history.

(56) References Cited

U.S. PATENT DOCUMENTS

| | | | |
|---|---|---|---|
| 5,479,303 A * | 12/1995 | Suzuki et al. ........... | 360/72.2 |
| 6,686,965 B1 * | 2/2004 | Fujii ..................... | 348/333.02 |
| 6,897,894 B1 * | 5/2005 | Miyazawa .............. | 348/231.8 |
| 7,355,620 B2 | 4/2008 | Ikehata et al. | |
| 2005/0219383 A1 * | 10/2005 | Ikeda .................... | 348/231.99 |
| 2006/0181550 A1 * | 8/2006 | Nohara ................... | 345/648 |
| 2007/0279512 A1 * | 12/2007 | Maruyama et al. ...... | 348/333.11 |
| 2008/0024599 A1 * | 1/2008 | Hirakawa ................ | 348/65 |

FOREIGN PATENT DOCUMENTS

| | | |
|---|---|---|
| JP | 2002-232847 (A) | 8/2002 |
| JP | 2004-104594 | 4/2004 |
| JP | 2004-104594 (A) | 4/2004 |
| JP | 2005-278152 (A) | 10/2005 |
| JP | 2006-279334 (A) | 10/2006 |
| JP | 2007-080460 (A) | 3/2007 |

OTHER PUBLICATIONS

Chinese Office Action dated Mar. 10, 2010 with English-language translation.
Notice of Reasons for Rejection dated May 10, 2011 (with an English translation).

* cited by examiner

*Primary Examiner* — Tuan Ho
*Assistant Examiner* — Kent Wang
(74) *Attorney, Agent, or Firm* — McGinn IP Law Group, PLLC (57) ABSTRACT

An image display device has a function that displays plural frame images by high-speed frame advancing, and includes: an operation portion for a high-speed frame advancing display operation for carrying out high-speed frame advancing display, and a stopping operation for stopping high-speed frame advancing; and a controlling unit controlling a display unit such that, when the high-speed frame advancing display operation is carried out, plural frame images are displayed at the display unit in a predetermined frame advancing order. The controlling unit controls the display unit such that, when the stopping operation is carried out, the high-speed frame advancing is stopped and frame images that were displayed are displayed at the display unit again by frame advancing in a reverse order that is opposite the frame advancing order.

20 Claims, 8 Drawing Sheets

IMAGE DISPLAY DEVICE, IMAGE PICKUP DEVICE, IMAGE DISPLAY CONTROLLING METHOD, AND PROGRAM STORING MEDIUM THEREFOR WITH STOPPING OPERATION FOR STOPPING HIGH-SPEED FRAME ADVANCING

CROSS-REFERENCE TO RELATED APPLICATION

This application claims priority under 35 USC 119 from Japanese Patent Application No. 2007-252269, the disclosure of which is incorporated by reference herein.

BACKGROUND OF THE INVENTION

1. Field of the Invention

The present invention relates to an image display device that displays images, an image pickup device equipped with the function of displaying images, a method of controlling image display, and a program storing medium for image display control.

2. Description of the Related Art

There are conventionally known digital cameras that are equipped with a display unit, such as a liquid crystal display or the like, that can display images that have been picked-up.

There are also known digital cameras having a function that causes a display unit, such as a liquid crystal display or the like, to carry out high-speed frame advancing display that displays respective picked-up static images by high-speed frame advancing, fast-forward display of picked-up moving images, and rewind display of picked-up moving images.

For example, Japanese Patent Application Laid-Open (JP-A) No. 2004-104594 proposes a digital camera that judges the direction and speed of a tracing operation by the fingertip of an operator on a touch panel, and carries out fast-forward display and rewind display, respectively, of moving images on a liquid crystal display in accordance with the direction and speed of the tracing operation.

However, in the technique disclosed in JP-A No. 2004-104594, when fast-forward display or rewind display is being carried out, it is difficult to temporarily stop frame advancing at a desired image and display the desired image. If the frame advancing is temporarily stopped at an image different than the desired image, manual operation is required in order for the desired image to be displayed.

SUMMARY OF THE INVENTION

The present invention provides an image display device that improves the operability of the operation of stopping frame advancing at a desired frame image, an image pickup device equipped with a function of displaying images, a method of controlling image display, and a program storing medium therefor.

In order to achieve the above-described object, an image display device of a first aspect of the present invention includes: an operation portion at which are carried out a high-speed frame advancing display operation for carrying out high-speed frame advancing display that displays a plurality of frame images by high-speed frame advancing, and a stopping operation for stopping the high-speed frame advancing; and a controlling unit controlling a display unit such that, when the high-speed frame advancing display operation is carried out, a plurality of frame images are displayed at the display unit in a predetermined frame advancing order, and controlling the display unit such that, when the stopping operation is carried out, the high-speed frame advancing is stopped and frame images that were displayed are displayed again at the display unit by frame advancing in a reverse order that is opposite the frame advancing order.

In the image display device of the first aspect of the present invention, the display unit is controlled such that, when the high-speed frame advancing display operation, which is for carrying out high-speed frame advancing display that displays plural frame images by high-speed frame advancing, is carried out with respect to the operation portion, plural frame images are displayed in the predetermined frame advancing order at the display unit. Further, the display unit is controlled such that, when the stopping operation for stopping the high-speed frame advancing is carried out with respect to the operation portion, the high-speed frame advancing is stopped and the frame images that were displayed are displayed again by frame advancing in a reverse order that is opposite the frame advancing order.

The speed of the frame advancing in the reverse order may be made to be slower than the speed of the high-speed frame advancing.

The controlling unit may control so as to stop the frame advancing in the reverse order in accordance with an operation for stopping the frame advancing in the reverse order being carried out after the stopping operation is carried out.

Further, the controlling unit may control such that an image expressing at least one of a direction of frame advancing and a speed of frame advancing is displayed. In this way, it is easy to visually recognize whether high-speed frame advancing is being carried out or frame advancing in the reverse order is being carried out.

Moreover, the controlling unit may control such that the image, that was being displayed at the time when the stopping operation was carried out, is displayed in a reduced manner.

An image display device of a second aspect of the present invention includes: an operation portion at which are carried out a high-speed frame advancing display operation for carrying out high-speed frame advancing display that displays a plurality of frame images by high-speed frame advancing, and a stopping operation for stopping the high-speed frame advancing; and a controlling unit controlling a display unit such that, when the high-speed frame advancing display operation is carried out, a plurality of frame images are displayed at the display unit in a predetermined frame advancing order, and controlling the display unit such that, when the stopping operation is carried out, the high-speed frame advancing is stopped and an image that was being displayed is displayed at the display unit in a reduced manner.

In the image display device of the second aspect of the present invention, the display unit is controlled such that, when the high-speed frame advancing display operation, which is for carrying out high-speed frame advancing display that displays plural frame images by high-speed frame advancing, is carried out with respect to the operation portion, plural frame images are displayed at the display unit in the predetermined frame advancing order. Further, the display unit is controlled such that, when the stopping operation for stopping the high-speed frame advancing is carried out with respect to the operation portion, the high-speed frame advancing is stopped and the image that was being displayed is displayed in a reduced manner.

The controlling unit may control such that frame images that were displayed are displayed again frame-by-frame in the reverse order that is opposite the frame advancing order, in accordance with an operation to advance the frame images frame-by-frame being carried out after the stopping operation is carried out.

Further, the controlling unit may control such that, when an operation for high-speed frame advancing display again is carried out, the high-speed frame advancing display is carried out again from the image that was being displayed at the time when the stopping operation was carried out. In this way, if, for example, the stopping operation is carried out in error, the high-speed frame advancing display can be restarted easily.

An image pickup device of the present invention is structured to include the above-described image display device of the first or the second aspect of the present invention.

A method of controlling image display of a third aspect of the present invention includes: successively displaying a plurality of frame images in a predetermined order at an image display portion; receiving an instruction to stop the successive display of the plurality of frame images; and when the instruction is received, stopping the successive display and again displaying frame images, that were displayed, at the image display portion in a reverse order that is opposite the predetermined order.

A program storing medium of a fourth aspect of the present invention stores a program that causes a computer to control image display of a display unit, the program causing the computer to execute: a step of, at a time a high-speed frame advancing display operation, for carrying out high-speed frame advancing display that displays a plurality of frame images by high-speed frame advancing, is carried out with respect to an operation portion, controlling a display unit such that a plurality of frame images are displayed at the display unit in a predetermined frame advancing order; and a step of, at a time when a stopping operation for stopping the high-speed frame advancing is carried out with respect to the operation portion, controlling the display unit such that the high-speed frame advancing is stopped and frame images that were displayed are displayed again by frame advancing in a reverse order that is opposite the frame advancing order.

A program storing medium of a fifth aspect of the present invention stores a program that causes a computer to control image display of a display unit, the program causing the computer to execute: a step of, at a time a high-speed frame advancing display operation, for carrying out high-speed frame advancing display that displays a plurality of frame images by high-speed frame advancing, is carried out with respect to an operation portion, controlling a display unit such that a plurality of frame images are displayed at the display unit in a predetermined frame advancing order; and a step of, at a time when a stopping operation for stopping the high-speed frame advancing is carried out with respect to the operation portion, controlling the display unit such that the high-speed frame advancing is stopped and an image that was being displayed is displayed in a reduced manner.

As described above, the present invention has the excellent effect that, in cases in which high-speed frame advancing display is not stopped at a desired image, the desired image can be displayed while the labor of manual operation is suppressed.

Further, the present invention has the excellent effect of improving the operability of the operation of stopping frame advancing at a desired frame image, in cases of carrying out high-speed frame advancing.

Moreover, the present invention has the excellent effect that, in cases in which high-speed frame advancing is carried out and the high-speed frame advancing is stopped, the operability of the operation of stopping the frame advancing at a desired frame image is improved.

DETAILED DESCRIPTION OF THE INVENTION

Exemplary embodiments of the present invention will be described in detail hereinafter with reference to the drawings.

First Exemplary Embodiment

First, the external structure of a digital camera 10 relating to a first exemplary embodiment will be described with reference to FIGS. 1A, 1B and 1C.

Note that the present exemplary embodiment describes a case in which the present invention is applied to a digital camera having the function of carrying out image pickup of both static images and moving images.

Figure 1A:
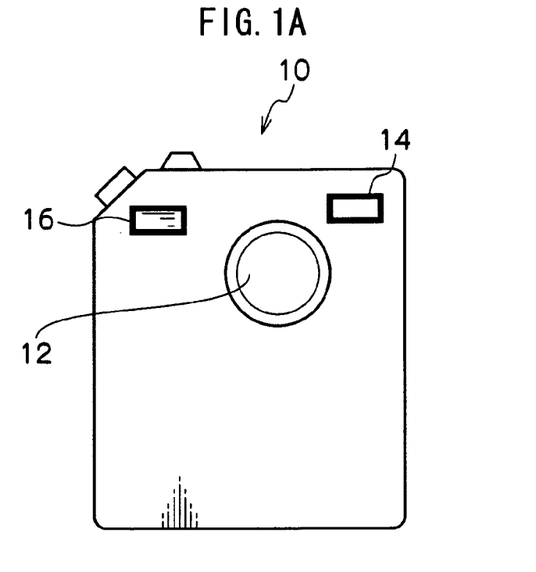
FIGS. 1A, 1B and 1C are respectively a front view, a plan view and a rear view showing the exterior of a digital camera relating to an exemplary embodiment of the present invention.

As shown in FIG. 1A, a lens 12 for focusing the image of the subject of photographing, a finder 14 that is used in order to decide upon the composition of the subject of photographing to be picked-up, and a light-emitting section 16 emitting light (auxiliary light for image pickup) that is illuminated onto the subject of photographing as needed at the time of image pickup, are provided at the front surface of the digital camera 10.

Figure 1B:
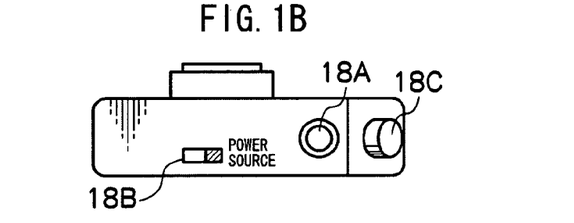

As shown in FIG. 1B, a release button (a so-called shutter) 18A which is pushed and operated at the time of executing image pickup, a power source switch 18B for switching the power source of the digital camera 10 between an on state and an off state, and a mode switching switch 18C are provided at the top surface of the digital camera 10.

The release button 18A is structured such that the following two stages of the operation of pushing the release button 18A can be detected: a state in which the release button 18A is pushed-down to an intermediate position (hereinafter called "half-depressed state"), and a state in which the release button 18A is pushed-down to a final pushed position which is past the intermediate position (hereinafter called "fully-depressed state"). At the digital camera 10, by setting the release button 18A in the half-depressed state, an AE (Automatic Exposure) function works such that the exposure state (the shutter speed, the state of the diaphragm) is set, and an AF (Auto Focus) function works such that focusing is controlled.

Thereafter, by continuing to push and setting the release button 18A in the fully-depressed state, exposure (image pickup) is carried out.

The mode switching switch 18C is rotated and operated at the time of setting the mode to any of a static image pickup mode that is a mode that carries out image pickup of a static image, a moving image pickup mode that is a mode that carries out image pickup of moving images, and a display mode that is a mode that displays, on a liquid crystal display 20 that will be described later, static images or moving images that were picked-up.

Figure 1C:
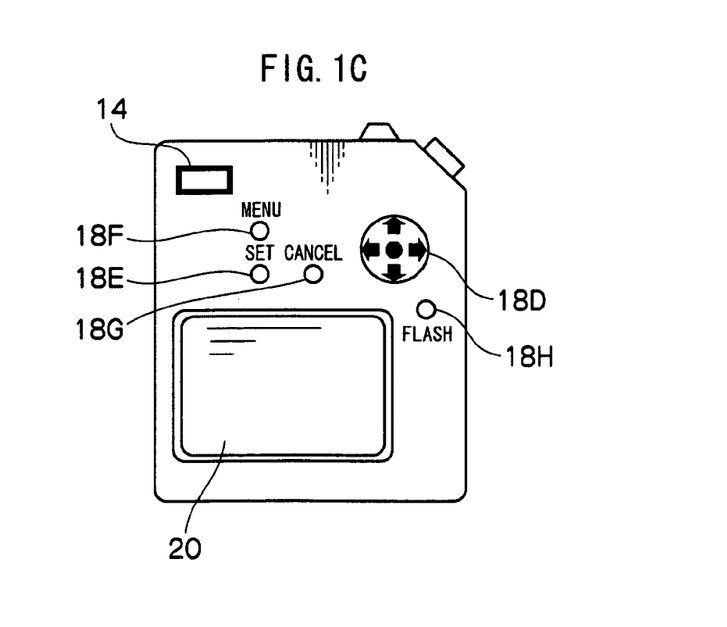

As shown in FIG. 1C, an eyepiece portion of the finder 14, the liquid crystal display (hereinafter called "LCD") 20 for displaying the picked-up image of the subject of photographing, menu screens and the like, and a cross cursor button 18D are provided at the rear surface of the digital camera 10. The cross cursor button 18D is structured so as to include four arrow buttons. When the right arrow button of the cross cursor button 18D is pressed and operated at the time of displaying a static image, the next static image in a predetermined order of frame advancing is displayed. When the left arrow button is pressed and operated at the time of displaying a static image, the previous static image in the order of frame advancing is displayed. Further, when the right arrow button is depressed for a long time at the time of displaying a static image, static images are displayed by high-speed frame advancing in the order of frame advancing. When the left arrow button is depressed for a long time at the time of displaying a static image, static images are displayed by reverse high-speed advancing in the order opposite the order of frame advancing. On the other hand, when the right arrow button is depressed for a long time at the time of displaying moving images, the moving images are played-back while being fast-forwarded. When the left arrow button is depressed for a long time at the time of displaying moving images, the moving images are played-back while being rewound. Moreover, inputting of directions of movement which are the four directions of up, down, left, right in the display region of the LCD 20, inputting of an instruction to frame-advance a played-back image, and the like are carried out by operating the four arrow buttons of the cross cursor button 18D.

A set button 18E, that is pushed and operated at the time of confirming the contents of operation of the cross cursor button 18D, is provided at the rear surface of the digital camera 10.

Also provided at the rear surface of the digital camera 10 are: a menu button 18F that is pushed and operated at the time of causing the LCD 20 to display a menu screen; a cancel button 18G that is pushed and operated at the time of canceling the contents of the operation immediately before; and a light-emission button 18H that is pushed and operated at the time of setting the light-emitting state of the light-emitting section 16.

Figure 2:
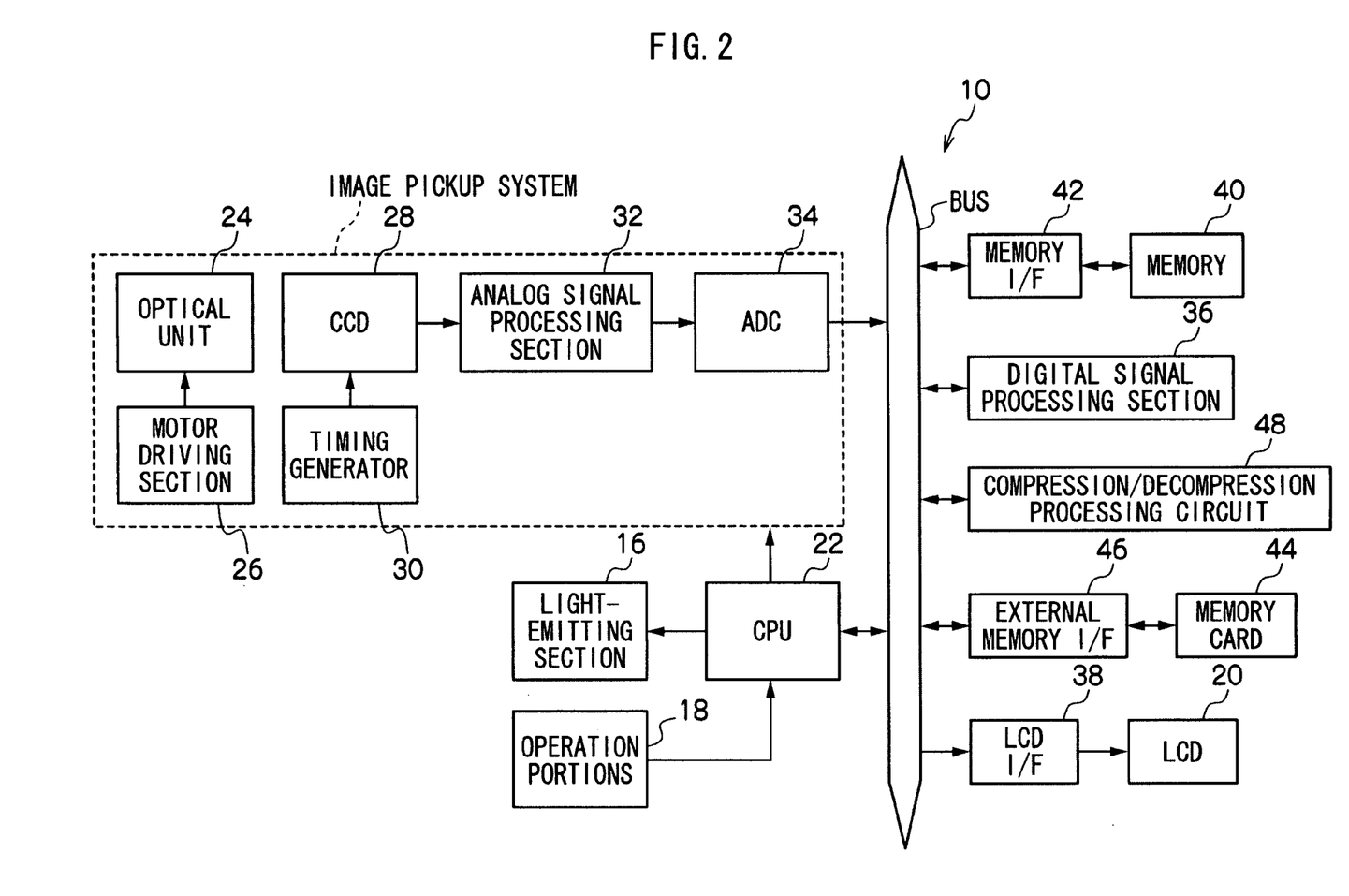
FIG. 2 is a block diagram showing the structure of the digital camera relating to the exemplary embodiment of the present invention.

The structure of the main portions of the electrical system of the digital camera 10 relating to the present exemplary embodiment will be described next with reference to FIG. 2.

A CPU (Central Processing Unit) 22, that governs the overall operations of the digital camera 10, is provided at the digital camera 10.

The digital camera 10 has an optical unit 24 that is structured to include the aforementioned lens 12, a focal point adjusting motor, a zoom motor, and a diaphragm driving motor. The lens 12 has plural lenses, and is structured as a zoom lens at which the focal length can be changed (magnification can be changed) by the focal point adjusting motor, the zoom motor and the diaphragm driving motor. The focal point adjusting motor, the zoom motor and the diaphragm driving motor are driven by driving signals supplied from a motor driving section 26 under the control of the CPU 22. Note that the driving of the zoom motor is carried out by operation of the cross cursor button 18D.

A charge coupled device (hereinafter called "CCD") 28 is disposed at the rear of the optical axis of the lens 12. A timing generator 30 that mainly generates timing signals for driving the CCD 28 and supplies the signals to the CCD 28, is provided at the digital camera 10. The CCD 28 is driven by the timing signals supplied from the timing generator 30 under the control of the CPU 22.

The output end of the CCD 28 is connected to the input end of an analog signal processing section 32 that caries out various types of analog signal processings on inputted analog signals. Further, the output end of the analog signal processing section 32 is connected to the input end of an analog/digital converter (hereinafter called "ADC") 34 that converts inputted analog signals into digital data.

The digital camera 10 is provided with a digital signal processing section 36 that carries out various types of digital signal processings on inputted digital data. The digital signal processing section 36 incorporates therein a line buffer of a predetermined capacity, and also carries out control so as to cause inputted digital data to be stored directly in a predetermined region of a memory 40 that will be described later.

The data, that is converted into digital image data by the ADC 34, is inputted to the digital signal processing section 36.

The digital camera 10 is structured so as to further include: an LCD interface 38 that generates signals for causing the LCD 20 to display the image of the subject of photographing, menu screens and the like, and supplies the signals to the LCD 20; the memory 40 that stores the digital image data obtained by image pickup, and the like; a memory interface 42 that carries out control of access to the memory 40; an external memory interface 46 for allowing a portable memory card 44 to be accessed at the digital camera 10; and a compression/decompression processing circuit 48 that carries out compression processing and decompression processing on digital image data.

Note that the digital camera 10 of the present exemplary embodiment uses a Flash Memory as the memory 40, and uses a Smart Media™ as the memory card 44.

The CPU 22, the digital signal processing section 36, the LCD interface 38, the memory interface 42, the external memory interface 46 and the compression/decompression processing circuit 48 are connected together via a system bus. The CPU 22 respectively carries out control of the operations of the digital signal processing section 36 and the compression/decompression processing circuit 48, display of various types of information on the LCD 20 via the LCD interface 38, access to the memory 40 via the memory interface 42, and access to the memory card 44 via the external memory interface 46.

The aforementioned various types of buttons and switches which are the release button 18A, the power source switch 18B, the mode switching switch 18C, the cross cursor button 18D, the set button 18E, the menu button 18F, the cancel button 18G and the light-emission button 18H (collectively called "operation portions 18" in FIG. 2) are connected to the CPU 22, and the CPU 22 grasps the states of operations with respect to the operation portions 18. Further, the light-emitting section 16 also is connected to the CPU 22, and the emission by the light-emitting section 16 of auxiliary light for image pickup is controlled by the CPU 22.

Next, the overall operation, at the time of image pickup, of the digital camera 10 relating to the present exemplary embodiment will be described briefly.

First, the CCD 28 carries out image pickup of a subject of photographing via the optical unit 24, and successively outputs, to the analog signal processing section 32, analog signals of R (red), G (green), and B (blue) that express the image of the subject of photographing. The analog signal processing section 32 carries out analog signal processings, such as correlated double sampling processing and the like, on the analog signals inputted from the CCD 28, and thereafter, successively outputs the processed signals to the ADC 34.

The ADC 34 converts the R, G, B analog signals inputted from the analog signal processing section 32 into R, G, B digital image data of 12 bits respectively, and successively outputs the digital image data to the digital signal processing section 36. The digital signal processing section 36 accumulates the digital image data, that is successively inputted from the ADC 34, in a line buffer that is incorporated in the digital signal processing section 36, and directly stores the digital image data in a predetermined region of the memory 40 temporarily.

The digital image data, that is stored in the predetermined region of the memory 40, is read-out in accordance with control by the CPU 22. The digital signal processing section 36 carries out white balance adjustment by applying, to the read-out digital-image data, a digital gain that corresponds to a predetermined physical amount, and carries out gamma processing and sharpness processing, and generates 8-bit digital image data.

Then, the digital signal processing section 36 carries out YC signal processing on the generated 8-bit digital image data, and generates a luminance signal Y and chroma signals Cr, Cb (hereinafter called "YC signals"), and stores the YC signals in a region of the memory 40 that is different than the aforementioned predetermined region.

Note that the LCD 20 is structured so as to be able to be used as a finder and display through images that are obtained by continuous image pickup by the CCD 28. In a case in which the LCD 20 is used as a finder, the CPU 22 successively outputs the generated YC signals to the LCD 20 via the LCD interface 38. Through images are thereby displayed on the LCD 20.

In a case in which the static image pickup mode is set, at the time when the release button 18A is set in the half-depressed state by an operator, as described above, the AE function works and the exposure state is set, and the AF function works and focus control is carried out. Thereafter, at the time when pushing of the release button 18A is continued such that the release button 18A is set in the fully-depressed state, auxiliary light for image pickup is emitted from the light-emitting section 16 as needed. Further, the YC signals stored in the memory 40 at that point in time are compressed in a predetermined compression format (JPEG in the present exemplary embodiment) by the compression/decompression processing circuit 48, and thereafter, are recorded as an electronic file in the memory card 44 via the external memory interface 46.

On the other hand, in a case in which the moving image pickup mode is set, at the time when the release button 18A is set in the fully-depressed state, auxiliary light for image pickup is emitted from the light-emitting section 16 as needed. Further, from that point in time, the YC signals stored in the memory 40 are compressed in a predetermined compression format (Motion JPEG in the present exemplary embodiment) by the compression/decompression processing circuit 48 in time sequence per predetermined time period, and thereafter, are successively recorded in the memory card 44 via the external memory interface 46. The recording operation ends at the time when the release button 18A is again set in the fully-depressed state. Due to this action, moving image data expressing moving images is recorded as an electronic file in the memory card 44.

The flow of processings of high-speed frame advancing display of static images, that is executed at the digital camera 10 in a case in which the display mode is set, will be described next.

The flow of processings of the high-speed frame advancing display of static images, that is executed at the digital camera 10 relating to the present exemplary embodiment, will be described with reference to FIGS. 3 through 8.

Figure 3:
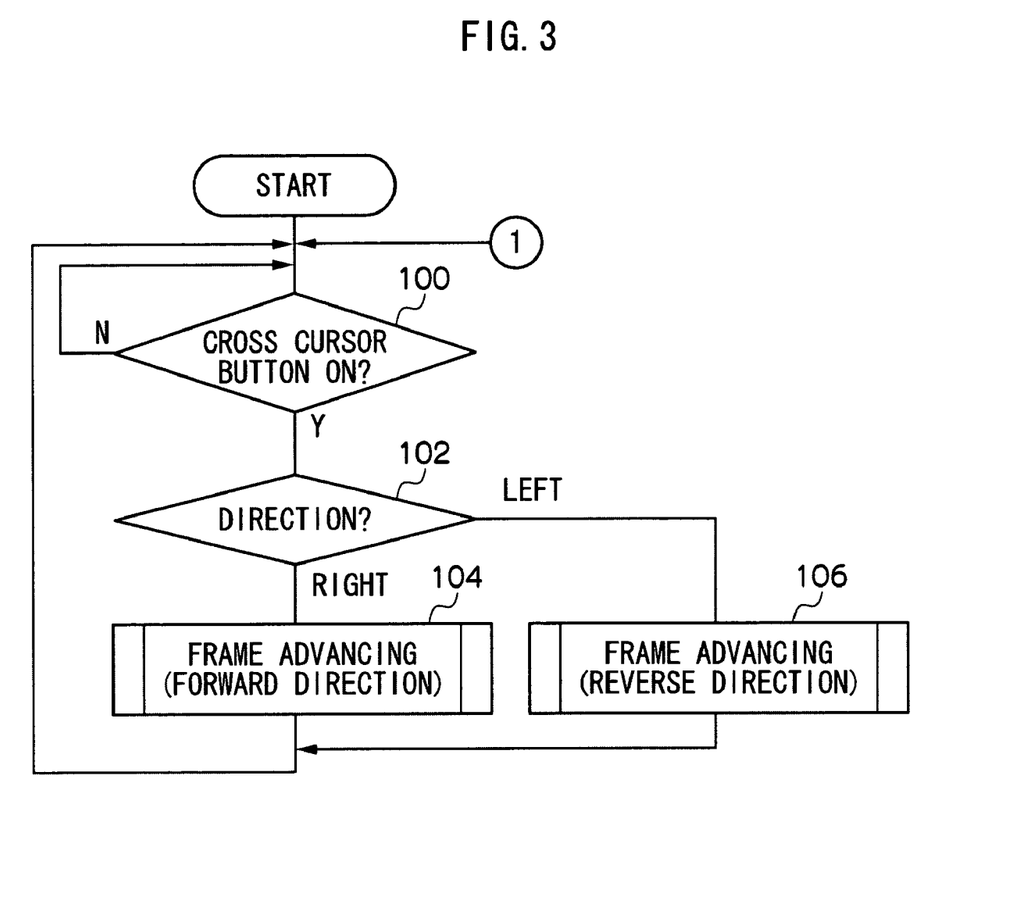
FIG. 3 is a flowchart showing a static image display processing routine relating to a first exemplary embodiment.

In step 100 of FIG. 3, it is judged whether or not the cross cursor button 18D is in an on state. If the judgment is affirmative, the routine moves on to step 102. If the judgment is negative, the routine returns to step 100.

In step 102, the direction of the arrow of the cross cursor button 18D that is in the on state is judged. If the direction is judged to be right, the routine moves to the forward direction frame advancing processing routine of step 104. If the direction is judged to be left, the routine moves to the reverse direction frame advancing processing routine of step 106.

Figure 4:
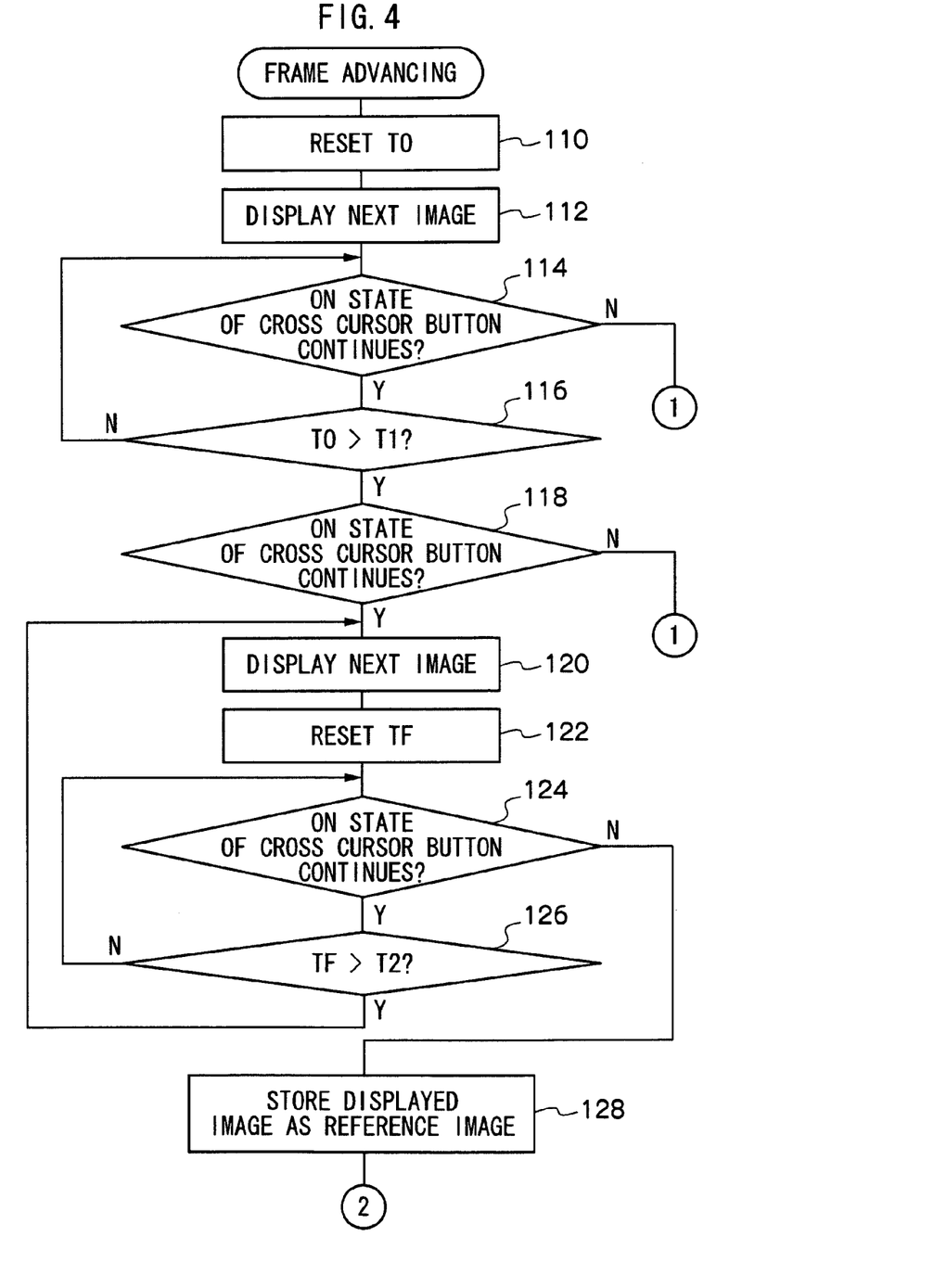
FIG. 4 is a flowchart showing a static image high-speed frame advancing processing routine relating to the first exemplary embodiment.

The frame advancing processing routine will be described next with reference to FIG. 4.

In step 10, a timer "T0", that measures the time of the on state of the cross cursor button 18D, is reset.

In step 112, in the case of the forward direction, the next static image in a predetermined frame advancing order is displayed, whereas, in the case of the reverse direction, the previous static image in the predetermined frame advancing order is displayed.

In step 114, it is judged whether or not the on state of the cross cursor button 18D continues. If the judgment is affirmative, the routine moves on to step 116, and if the judgment is negative, the routine moves on to step 100 of FIG. 3.

In step 116, it is judged whether or not the timer "T0" has exceeded a time "T1" that is considered to be depression over a long time period. If the judgment is affirmative, the routine moves on to step 118, and if the judgment is negative, the routine returns to step 114.

In step 118, it is judged whether or not the on state of the cross cursor button 18D continues, i.e., whether or not the cross cursor button 18D is being depressed over a long time period. If the judgment is affirmative, the routine moves on to step 120. If the judgment is negative, the routine moves on to step 100 of FIG. 3.

In step 120, in the case of the forward direction, the next static image in the predetermined frame advancing order is displayed, whereas, in the case of the reverse direction, the previous static image in the predetermined frame advancing order is displayed.

In step 122, a timer "TF", that measures the display time of the static image that is being displayed, is reset.

In step 124, it is judged whether or not the on state of the cross cursor button 18D continues. If the judgment is affirmative, the routine moves on to step 126, and if the judgment is negative, the routine moves on to step 128.

In step 126, it is judged whether or not the timer "TF" has exceeded a display time "T2" of each static image in the case of carrying out high-speed frame advancing display. If the judgment is affirmative, the routine moves on to step 120, and if the judgment is negative, the routine returns to step 124.

In step 128, the static image that is being displayed is stored as a reference image.

Figure 5:
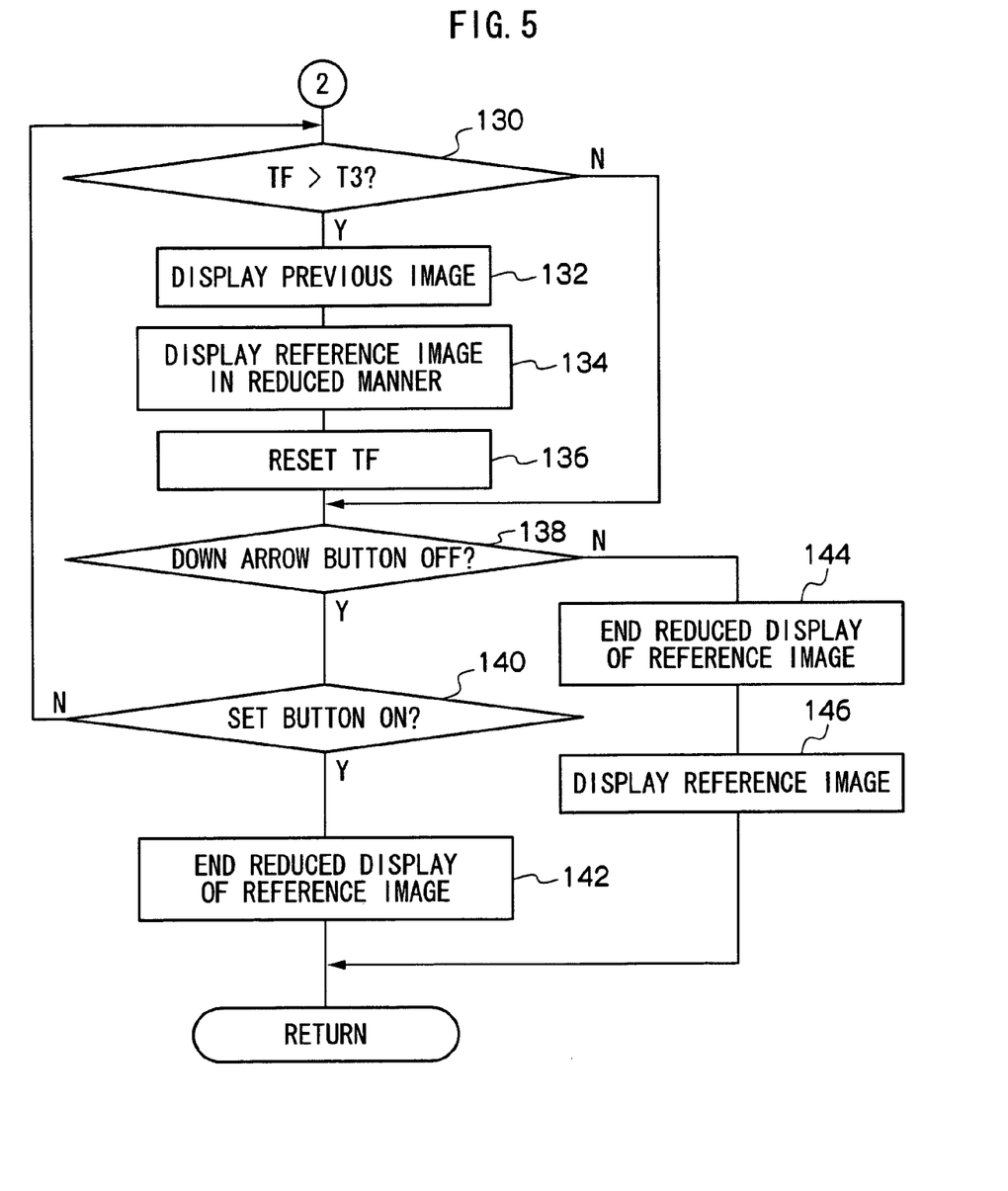
FIG. 5 is a flowchart showing a first routine at a time of stopping the static image high-speed frame advancing processing relating to the first exemplary embodiment.
Figure 7:
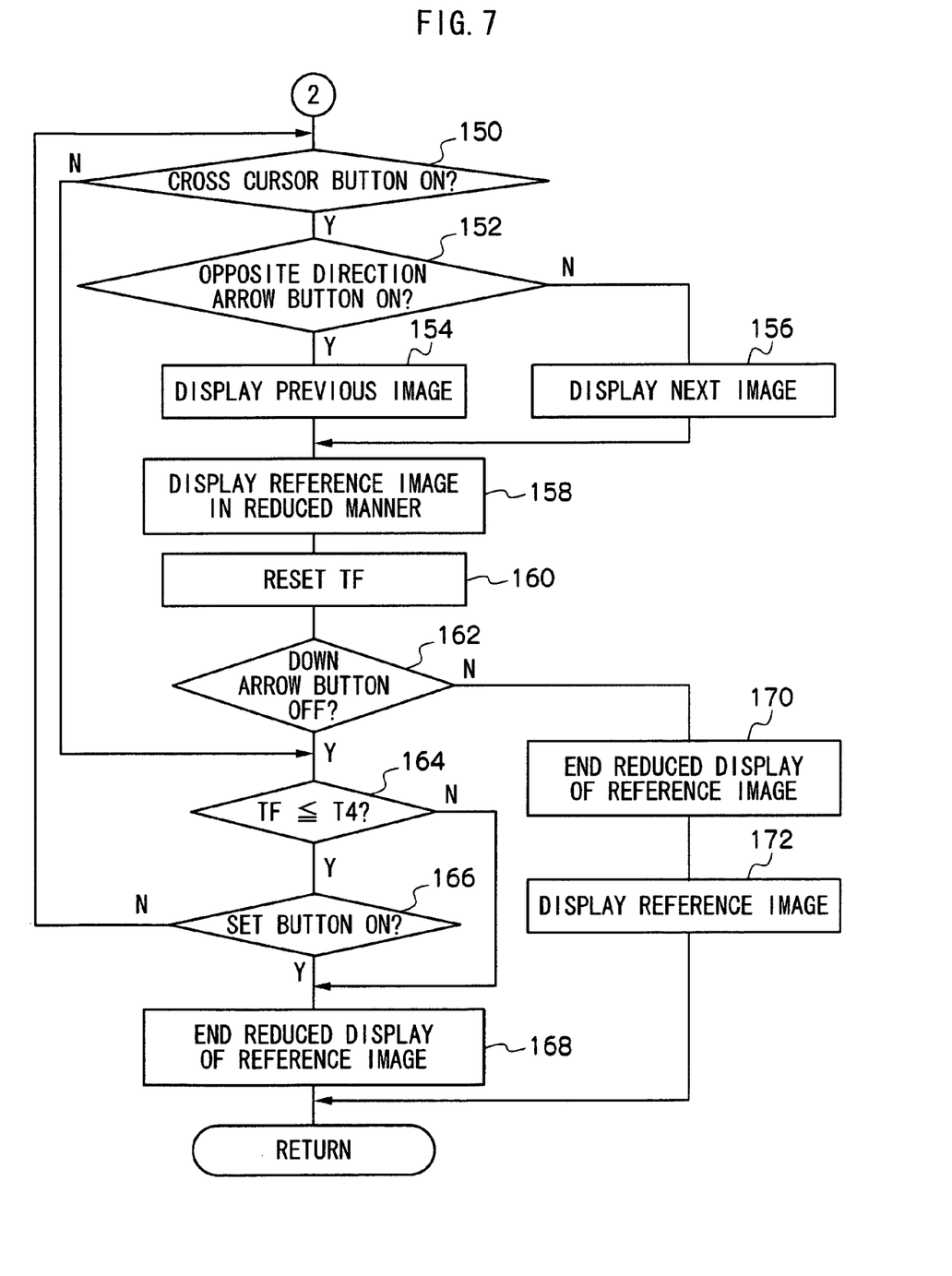
FIG. 7 is a flowchart showing a second routine at a time of stopping the static image high-speed frame advancing processing relating to the first exemplary embodiment.

After step 128, the routine proceeds either to step 130 of FIG. 5 or step 150 of FIG. 7. The operator can decide which of these steps to move on to.

In step 130 of FIG. 5, it is judged whether or not the timer "TF" has exceeded a predetermined time "T3" that is set in advance. If the judgment is affirmative, the routine moves on to step 132. If the judgment is negative, the routine moves on to step 138. This predetermined time that is set in advance is a time that is longer than "T2", and is a time in which the operator can carry out, on the operation portion 18, the operation of stopping the frame advancing.

In step 132, in the case of the forward direction, the previous static image in the predetermined frame advancing order is displayed, whereas, in the case of the reverse direction, the next static image in the predetermined frame advancing order is displayed.

In step 134, a reduced image of the reference image is displayed in a state of being superposed on the static image displayed in step 132.

In step 136, the timer "TF" is reset.

In step 138, it is judged whether or not the down arrow button of the cross cursor button 18D is in an off state. If the judgment is affirmative, the routine moves on to step 140. If the judgment is negative, the routine proceeds to step 144.

In step 140, it is judged whether or not the set button 18E is in an on state. If the judgment is affirmative, the routine moves on to step 142, and if the judgment is negative, the routine returns to step 130.

In step 142 and step 144, display of the reduced image of the reference image ends.

In step 146, the reference image is displayed.

Figure 6A:
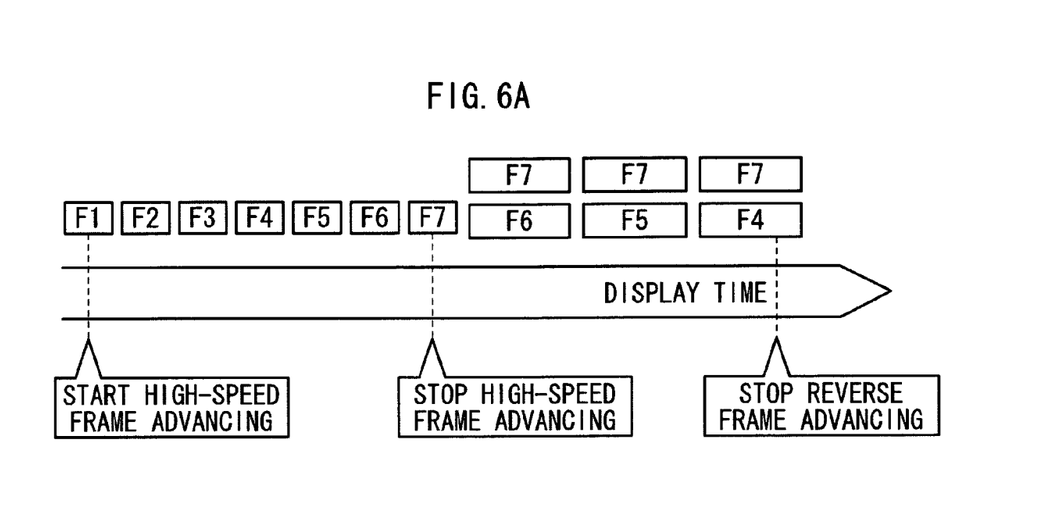
FIGS. 6A, 6B and 6C are drawings explaining the concept of first high-speed frame processing of static images relating to the first exemplary embodiment.

As shown in FIG. 6A, when the right arrow button of the cross cursor button 18D is depressed for a long time during display of static image F1, static images F1, F2, F3, F4, F5, F6, F7 . . . are displayed by high-speed frame advancing in order at an interval of the time "T2". If the operation on the right arrow button of the cross cursor button 18D disappears during display of the static image F7, the high-speed frame advancing is stopped. The static images that were displayed are displayed again by frame advancing in the order opposite the frame advancing order, at the interval of the time "T3" until the set button 18E is pushed and operated. Further, as shown in FIG. 6C, a reduced image SF of the static image, that was being displayed at the time when the operation on the cross cursor button 18D disappeared, is displayed. Namely, static images F6, F5, F4 are displayed by frame advancing in that order. The display time of each static image at the time of carrying out reverse-order frame advancing is longer than the display time of each static image at the time of high-speed frame advancing display.

Figure 6B:
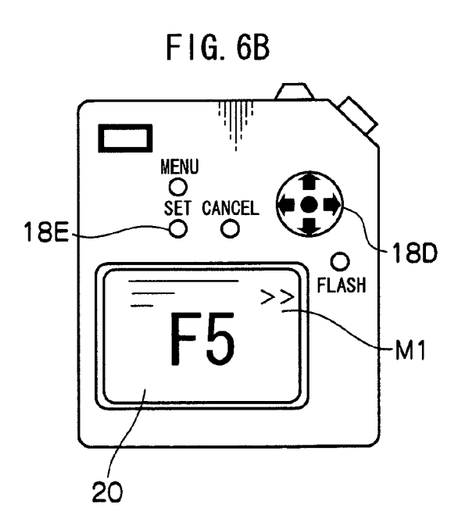
Figure 6C:
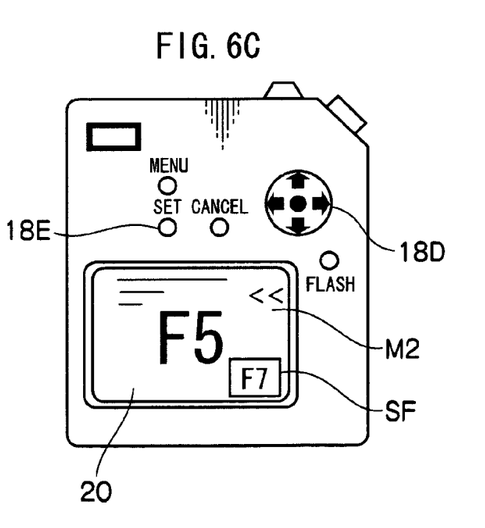

Further, in the present exemplary embodiment, as shown in FIG. 6B and FIG. 6C, images M1, M2 that show the direction of the frame advancing are displayed during the frame advancing.

During the time when the high-speed frame advancing is stopped and frame advancing is carried out at a slow speed, the colors of the images M1, M2 may be changed, or the colors of the images M1, M2 may be displayed in a blinking manner, so as to indicate that the speed of the frame advancing is slow.

In this way, in the routine shown in FIG. 5, after high-speed frame advancing is stopped, reverse-order frame advancing is carried out automatically. Due thereto, in cases in which the high-speed frame advancing is not stopped at a desired image, the desired image is displayed while the labor of manual operation is suppressed.

On the other hand, in step 150 of FIG. 7, it is judged whether or not the cross cursor button 18D is in an on state. If the judgment is affirmative, the routine moves on to step 152, whereas if the judgment is negative, the routine proceeds to step 164.

In step 152, it is judged whether or not the direction of the arrow of the cross cursor button 18D that is in an on state is the direction opposite the direction judged in step 102. If the judgment is affirmative, the routine proceeds to step 154. If the judgment is negative, the routine proceeds to step 156.

In step 154, in the case of the forward direction, the previous static image in the predetermined frame advancing order is displayed, whereas, in the case of the reverse direction, the next static image in the predetermined frame advancing order is displayed.

In step 156, in the case of the forward direction, the next static image in the predetermined frame advancing order is displayed, whereas, in the case of the reverse direction, the previous static image in the predetermined frame advancing order is displayed.

In step 158, a reduced image of the reference image is displayed so as to be superposed on the static image displayed in step 154 or step 156.

In step 160, the timer "TF" is reset.

In step 162, it is judged whether or not the down arrow button of the cross cursor button 18D is in an off state. If the judgment is affirmative, the routine moves on to step 164. If the judgment is negative, the routine moves on to step 170.

In step 164, it is judged whether or not the timer "TF" is less than or equal to a predetermined time "T4" that is set in advance. If the judgment is affirmative, the routine proceeds to step 166, whereas if the judgment is negative, the routine moves on to step 168. This predetermined time that is set in advance is a time in which it is considered that the operator cancelled the frame advancing operation.

In step 166, it is judged whether or not the set button 18E is in an on state. If the judgment is affirmative, the routine moves on to step 168. If the judgment is negative, the routine returns to step 150.

In step 168 and step 170, the display of the reduced image of the reference image ends.

In step 172, the reference image is displayed.

In this way, in the routine shown in FIG. 7, after the high-speed frame advancing is stopped, a reduced image of the static image that was being displayed at the time when the high-speed frame advancing was stopped is displayed. In this way, if, for example, the high-speed frame advancing is stopped in error, the high-speed frame advancing can be restarted easily.

Note that, although the present exemplary embodiment describes a case of displaying static images, in the case of displaying moving images, the advancing processing of each frame is carried out in accordance with the above-described flowcharts.

Further, the present exemplary embodiment describes a structure that, by operation of the cross cursor button, instructs frame advancing display of static images, fast-forward display of moving images, and rewind display of moving images. However, a structure that instructs these respective displays by operation of another button may be employed. Similarly, another button may be substituted for the set button.

Second Exemplary Embodiment

An exemplary embodiment of a case in which the processings of frame advancing display of static images, fast-forward display of moving images, and rewind display of moving images, that are executed by the above-described digital camera 10, are executed at a personal computer, will be described next.

Figure 8:
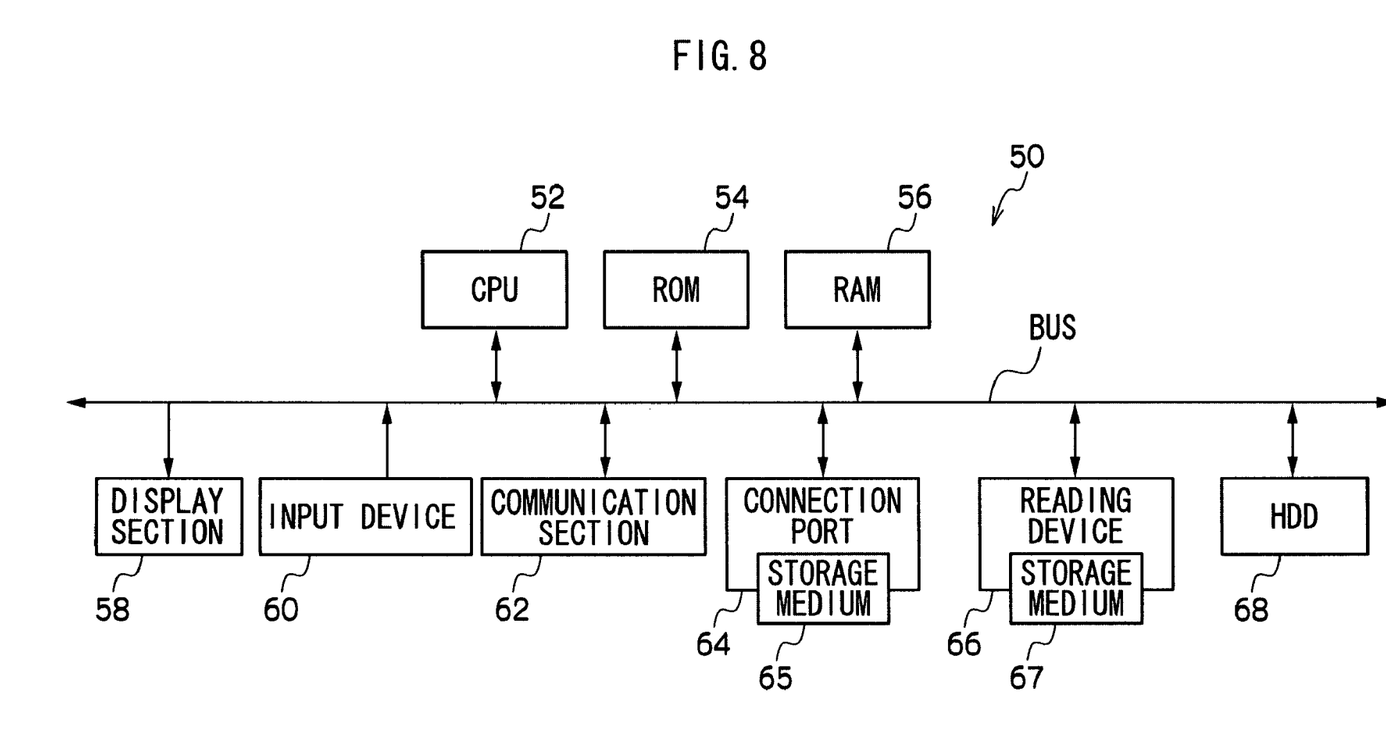
FIG. 8 is a block diagram showing the structure of a computer that is an image display device relating to a second exemplary embodiment.

FIG. 8 is a block diagram showing the schematic structure of a computer 50 that is an image display device.

The computer 50 is structured to include a CPU (Central Processing Unit) 52, a ROM (Read Only Memory) 54, a RAM (Random Access Memory) 56, a display section 58, an input device 60, a communication section 62, a connection port 64, a reading device 66, and an HDD (Hard Disk Drive) 68. These are respectively connected via a bus so as to be able to transmit and receive signals.

The CPU 52 governs the overall operation of the computer 50, and executes the processings of the above-described frame advancing display of static images, fast-forward display of moving images and rewind display of moving images, in accordance with a program.

The ROM 54 is a non-volatile storage device in which a boot program, that operates at the time of start-up of the computer 50, and the like are stored.

The RAM 56 is a volatile storage device that stores programs used in execution of processings by the CPU 52, parameters that are changed appropriately in the execution, and various types of log data acquired during operation of the computer 50.

The display section 58 is formed from a liquid crystal display, a CRT (Cathode Ray Tube) or the like, and displays static images and moving images.

The input device 60 is a device for instructions relating to image display, such as an instruction for high-speed frame advancing display of static images, an instruction for fast-forward display of moving images, an instruction for rewind display of moving images, or the like, to be inputted by operation by an operator.

The communication section 62 carries out transmission and reception of data between the computer 50 and external devices that are connected either directly or via a network.

The connection port 64 has a connecting portion such as a USB, an IEEE 1394 or the like, and is a port for connecting an external device to the computer 50. A storage medium 65 such as a USB memory or the like can be connected to the computer 50 via the connection port 64.

The reading device 66 is a device in which a storage medium 67, such as a magneto-optical disk, an optical disk, a magnetic disk or the like is loaded, and that reads stored contents from the storage medium 67. A magneto-optical disk device for reading stored contents of magneto-optical disks, an optical disk device for reading stored contents of optical disks, a magnetic disk device for reading stored contents of magnetic disks, or the like can be used for the reading device 66.

The HDD 68 is a nonvolatile storage device in which are stored an operating system, the program for executing the processings of the above-described frame advancing display of static images, fast-forward display of moving images and rewind display of moving images, data used in the execution of the program, data that is transmitted to and received from external devices via the communication section 62, and the like.

The HDD 68 stores the image files of the static images and moving images that are displayed at the display section 58. The image files may be stored in the storage medium 65 or 67, read by the computer 50 via the connection port 64 or the reading device 66, and stored in the HDD 68. Or, the image files may be inputted to the computer 50 via the communication section 62 from an external device, and stored in the HDD 68.

By executing the program at the computer 50 in this way, the above-described frame advancing display of static images, fast-forward display of moving images, and rewind display of moving images can be carried out easily by a simple structure.

What is claimed is:

1. An image display device, comprising:
   an operation portion at which are carried out a high-speed frame advancing display operation for carrying out a high-speed frame advancing display that displays a plurality of frame images by a high-speed frame advancing, and a stopping operation for stopping the high-speed frame advancing; and
   a controlling unit controlling a display unit such that, when the high-speed frame advancing display operation is carried out, a plurality of frame images are displayed at the display unit in a predetermined frame advancing order, and controlling the display unit such that, when the stopping operation is carried out, the high-speed frame advancing is stopped based on the stopping operation and frame images that were displayed are displayed again at the display unit by a frame advancing in a reverse order that is opposite the frame advancing order.

2. The image display device of claim 1, wherein a speed of the frame advancing in the reverse order is slower than a speed of the high-speed frame advancing.

3. The image display device of claim 1, wherein the controlling unit controls the display unit so as to stop the frame advancing in the reverse order in response to an operation at the operation portion for stopping the frame advancing in the reverse order, which is performed after the stopping operation is carried out.

4. The image display device of claim 1, wherein the controlling unit controls the display unit such that an image expressing at least one of a direction of a frame advancing and a speed of the frame advancing is displayed.

5. The image display device of claim 1, wherein the controlling unit controls the display unit such that an image, that was being displayed at a time when the stopping operation was carried out, is displayed in a reduced manner.

6. The image display device of claim 5, wherein the controlling unit controls the display unit such that, when an operation for high-speed frame advancing display again is carried out, the high-speed frame advancing display is carried out again from the image that was being displayed at the time when the stopping operation was carried out.

7. An image pickup device, comprising the image display device of claim 1.

8. The image display device of claim 1, wherein the controlling unit controls the display unit such that an image expressing a direction of a frame advancing is displayed.

9. The image display device of claim 1, wherein, when the high-speed frame advancing is not stopped at a desired image, the desired image is displayed while a manual operation is performed.

10. An image display device, comprising:
    an operation portion at which are carried out a high-speed frame advancing display operation for carrying out a high-speed frame advancing display that displays a plurality of frame images by high-speed frame advancing, and a stopping operation for stopping the high-speed frame advancing; and
    a controlling unit controlling a display unit such that, when the high-speed frame advancing display operation is carried out, a plurality of frame images is displayed at the display unit in a predetermined frame advancing order, and controlling the display unit such that, when the stopping operation is carried out, the high-speed frame advancing is stopped and an image that was being displayed is displayed at the display unit in a reduced manner, wherein the controlling unit further controls the display unit such that frame images that were displayed are displayed again frame-by-frame in a reverse order that is opposite the predetermined frame advancing order, in response to an operation at the operation portion for advancing frame images frame-by-frame, which is performed after the stopping operation is carried out.

11. The image display device of claim 10, wherein the controlling unit controls the display unit such that, when an operation for high-speed frame advancing display again is carried out, the high-speed frame advancing display is carried out again from an image that was being displayed at a time when the stopping operation was carried out.

12. An image pickup device, comprising the image display device of claim 10.

13. A method of controlling image display, said method comprising:
   successively displaying a plurality of frame images in a predetermined order at an image display portion;
   receiving an instruction to stop the successive display of the plurality of frame images; and
   when the instruction to stop the successive display is received, stopping the successive display based on the instruction to stop the successive display, and again displaying frame images, that were displayed, at the image display portion in a reverse order that is opposite the predetermined order.

14. The method of controlling image display of claim 13, wherein a speed of successive display of frame images in the reverse order is slower than a speed of successive display of frame images in the predetermined order.

15. The method of controlling image display of claim 13, further comprising:
   receiving a stoppage instruction to stop the successive display of frame images in the reverse order; and
   stopping the successive display in the reverse order in response to the stoppage instruction.

16. The method of controlling image display of claim 13, further comprising displaying, at the image display portion, a display expressing at least one of a direction of display of frame images and a speed of display of the frame images.

17. The method of controlling image display of claim 13, further comprising displaying, in a reduced manner and at the image display portion, a frame image that was being displayed at the image display portion at a time of receiving an instruction to stop the successive display.

18. The method of controlling image display of claim 13, further comprising:
   after receiving an instruction to stop the successive display, receiving an instruction to successively display the plurality of frame images again at the image display portion in the predetermined order; and
   successively displaying the plurality of frame images again at the image display portion in the predetermined order from an image that was being displayed at the image display portion at a time when the instruction to stop the successive display was received.

19. A non-transitory program storing medium storing a program that causes a computer to control image display of a display unit, the program causing the computer to execute:
   at a time of a high-speed frame advancing display operation, for carrying out high-speed frame advancing display that displays a plurality of frame images by a high-speed frame advancing, is carried out with respect to an operation portion, controlling a display unit such that a plurality of frame images are displayed at the display unit in a predetermined frame advancing order; and
   at a time when a stopping operation for stopping the high-speed frame advancing is carried out with respect to the operation portion, controlling the display unit such that the high-speed frame advancing is stopped and frame images that were displayed are displayed again by a frame advancing in a reverse order that is opposite the frame advancing order.

20. A non-transitory program storing medium storing a program that causes a computer to control image display of a display unit, the program causing the computer to execute:
   at a time of a high-speed frame advancing display operation, for carrying out a high-speed frame advancing display that displays a plurality of frame images by a high-speed frame advancing, is carried out with respect to an operation portion, controlling a display unit such that a plurality of frame images is displayed at the display unit in a predetermined frame advancing order; and
   at a time when a stopping operation for stopping the high-speed frame advancing is carried out with respect to the operation portion, controlling the display unit such that the high-speed frame advancing is stopped and an image that was displayed is displayed in a reduced manner,
   wherein the display unit is further controlled such that frame images that were displayed are displayed again frame-by-frame in a reverse order that is opposite the predetermined frame advancing order, in response to an operation at the operation portion for advancing frame images frame-by-frame, which is performed after the stopping operation is carried out.

* * * * *